3,337,275
GAS-LUBRICATED PLAIN JOURNAL BEARING
Yüang-Heng Dschen, Baden, Switzerland, assignor to Aktiengesellschaft Brown, Boveri & Cie, Baden, Switzerland, a joint-stock company
Filed Aug. 24, 1965, Ser. No. 482,195
Claims priority, application Switzerland, Sept. 22, 1964, 12,301/64
4 Claims. (Cl. 308—9)

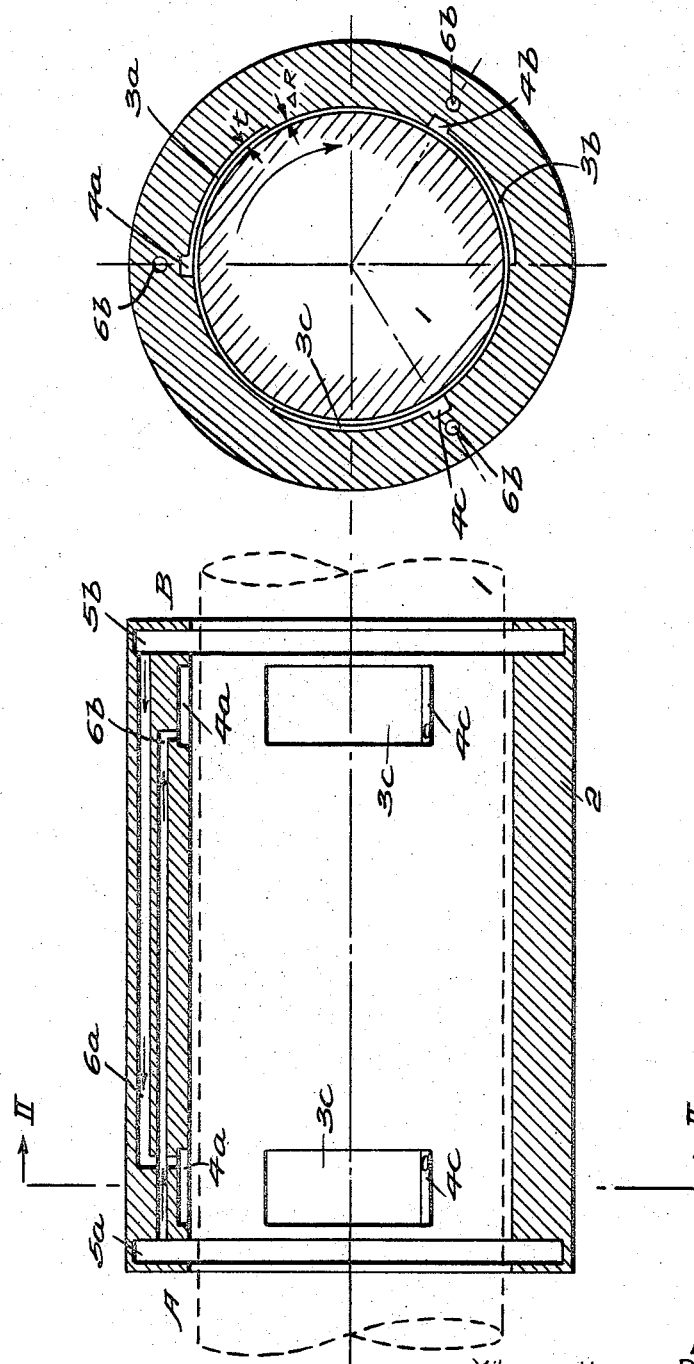

This invention relates to gas-lubricated plain journal bearings and is directed particularly to an improvement in the plain journal bearing structure as disclosed in my previous United States Patent No. 3,167,362, issued Jan. 26, 1965.

The bearing structure as disclosed in that patent is designed for high speed operation of the shaft with gas lubrication, the bearing being provided with a cylindrical bore and with stabilizing pockets at both ends of the running surface of the bearing, each stabilizing pocket being provided at the inlet with an axial groove extending substantially over the width of the stabilizing pocket and, apart from the small gaps at the ends of the bearing, having no direct communication with the surrounding atmosphere.

It is furthermore disclosed in the aforesaid patent to arrange an annular groove in each case between the stabilizing pockets and axial grooves and the ends of the bearing. These annular grooves which open onto the shaft have the purpose of limiting the exchange of gas between the lubricating gap and the bearing surroundings, in order to protect the running surface of the bearing from contamination. This dispenses with the use of special aspirator conduits or filters for the lubricating gas.

As opposed to known bearings having multiple running surfaces, a plain journal bearing constructed in this manner exhibits sufficient load capacity on the part of the lubricating film even at low speeds, and works without instability of shaft movement at high speeds, as is confirmed by machines which have been made.

Besides the problems of load capacity and stability, hydrodynamically gas-lubricated bearings involve the problem of distortion of the bearing under thermal stresses when in operation, since the low load capacity of a gas bearing demands exceptionally small clearance, large axial length and consequently great accuracy in shaping the bearing if it is to work. In the case of turbo-machines working with very hot gases, the load-carrying bearing adjacent to the impeller is especially subjected to disadvantageous stresses because of the unilateral heating. Inadmissible differences in temperature between both ends of the bearing and unequal amounts of thermal expansion in the body thereof can occur in operation, endangering reliability in machines. The present invention has the object of overcoming these difficulties. It is characterized in that at least one axial groove at least one of the two ends of the bearing is linked by at least one special duct to the annular groove at the other end of the bearing.

This method makes it possible to attain a continuous exchange of lubricating gas, with a resultant equalization of temperature, between the two ends of the bearing, without any special and more particularly moving auxiliary means.

One suitable embodiment of the invention is illustrated in the accompanying drawings wherein:

FIGURE 1 shows an axial section of the gas-lubricated plain journal bearing, and FIGURE 2 shows a radial section along the line II—II in FIGURE 1.

With reference now to the drawing, a shaft 1 runs in a cylindrical, i.e. plain, bearing bushing 2, near the ends A and B of which a plurality of recesses or so-called stabilizing pockets 3a, 3b, and 3c are arranged after the manner of segments over the circumference. The width of these stabilizing pockets in the axial direction is made such that it amounts at most to one sixth of the width of the bearing. They are usually narrower, so that there remains between them a load-carrying middle portion with a cylindrical bore without any grooves or holes of any kind, and at least two thirds of the width of the bearing. Each of the stabilizing pockets 3a, 3b, 3c is provided at its inlet, considered in the direction in which the shaft 1 rotates, with an axial groove 4a, 4b, 4c respectively, extending over the width of the stabilizing pockets. The depth $t$ of the stabilizing pockets is of the same order of magnitude as the radial bearing clearance $\Delta R$ between the shaft 1 and the bearing bushing 2. Annular grooves 5a and 5b are turned into the bearing bushing 2 between the stabilizing pockets and axial grooves and the ends of the bearings, these annular grooves being open toward the shaft.

In the present embodiment, the axial grooves 4a, 4b, 4c at the ends A and B of the bearing are linked by one or more communicating ducts 6a and 6b extending in the bearing bushing 2 to the annular groove 5b or 5a at the end B or A of the bearing.

An essential advantage of this type of links 6a and 6b between the axial grooves 4a, 4b, 4c and the annular grooves 5a, 5b resides in that intensive exchange of the lubricating gas enclosed in the annular grooves 5a and 5b can take place.

In operation, the stabilizing pockets 3a, 3b, 3c at the opposite ends A and B of the bearing work as viscosity pumps, delivering lubricating gas from one end A or B of the bearing to the annular groove at the other end B or A of the bearing. The consequence of these operations, which take place simultaneously in both directions, is that a large amount of equalization is imparted to the temperature difference prevailing between the two ends A and B of the bearing.

Besides the above-named function of temperature equalization, these internal links fulfill another useful function for hydrodynamically gas-lubricated plain journal bearings, namely, that of increased stabilization. In particular, linking the axial grooves 4a on the unloaded side of the bearing surface to one of the annular grooves 5a, 5b can prevent negative pressure from developing in the lubricating gap of the bearing.

For stabilizing purposes, the pockets may be of unequal depth for the purpose of adaption to shaft displacement. For example, in the embodiment illustrated, the pocket 3a on the unloaded side of the bearing may be deeper than the stabilizing pockets 3b and 3c, according to the degree of eccentricity assumed by the shaft when in operation, enabling stability to be further increased.

For certain applications of use, it may be advantageous to distribute the stabilizing pockets non-uniformly over the circumference and, where appropriate, to provide fewer than three pockets per end of the bearing. For example, if relatively heavy demands are made on the load capacity of the bearing, the pocket 3b together with the inlet groove 4b on the loaded side of the bearing may be omitted. This results in both ends of the bearing making an increased contribution to the load capacity. It is furthermore possible to make the stabilizing pockets unequal in width to correspond to the purpose in view.

In certain cases, where operating speed is relatively low and bearing loading relatively high, the axial grooves 4a, 4b, 4c likewise provide sufficient stabilization on their own, i.e. without the associated pockets 3a, 3b, 3c.

I claim:
1. In a hydrodynamically gas-lubricated plain journal bearing structure which comprises in combination a cylindrical bearing bushing the inner cylindrical surface of which serves as a bearing surface for a shaft, said inner cylindrical bearing surface at each end thereof being interrupted by a plurality of circumferentially spaced stabilizing pockets having a depth of the same order of magnitude as the radial bearing clearance between the mating surfaces of said shaft and bushing and a width which in the axial direction amounts to not more than one-sixth of the width of said bearing bushing, each said pocket being provided at its inlet as viewed in the direction of shaft rotation with an axial groove extending over substantially the width of the pocket, the improvement characterized by a communicating duct extending between the axial groove at the inlet to one of said pockets at one end of said bearing bushing to an annular groove in the interior surface of said bearing bushing at the opposite end thereof.

2. A hydrodynamically gas-lubricated plain journal bearing structure as defined in claim 1 wherein a plurality of communicating ducts are provided respectively between the axial grooves at the inlets of the stabilizing pockets at each end of said bearing bushing and annular grooves in the interior surface of said bearing bushing at the opposite end thereof.

3. A hydrodynamically gas-lubricated plain journal bearing as defined in claim 1 wherein said communicating duct extends longitudinally through the wall of said bearing bushing.

4. A hydrodynamically gas-lubricated plain journal bearing as defined in claim 1 wherein a plurality of communicating ducts are provided respectively between axial grooves at the inlets of correspondingly positioned stabilizing pockets at each end of said bearing bushing on the unloaded side of the bearing surface and annular grooves in said bearing bushing at the opposite end thereof.

References Cited

UNITED STATES PATENTS 3,167,363   1/1965   Dschen.

MARTIN P. SCHWADRON, *Primary Examiner.*

F. SUSKO, *Assistant Examiner.*